W. E. ROYSTER, Jr., AND K. B. ROYSTER.
COMPUTING MACHINE.
APPLICATION FILED SEPT. 3, 1920.

1,414,436.

Patented May 2, 1922.
6 SHEETS—SHEET 3.

WITNESSES

INVENTORS
W. E. Royster, Jr.,
K. B. Royster;
BY
ATTORNEYS

UNITED STATES PATENT OFFICE.

WILLIAM EDWIN ROYSTER, JR., AND KENNETH BETHEL ROYSTER, OF HENDERSON, KENTUCKY.

COMPUTING MACHINE.

1,414,436.  Specification of Letters Patent.  Patented May 2, 1922.

Application filed September 3, 1920. Serial No. 407,864.

*To all whom it may concern:*

Be it known that we, WILLIAM EDWIN ROYSTER, Jr., and KENNETH BETHEL ROYSTER, citizens of the United States, and residents of Henderson, in the county of Henderson and State of Kentucky, have invented certain new and useful Improvements in Computing Machines, of which the following is a specification.

Our invention is an improvement in computing machines, and has for its object to provide a machine of the character specified, wherein a number of series of chart rollers is mounted to revolve about a common axis, and to rotate on their own axes, the rollers of each series bearing complementary data, and wherein means is provided for bringing the rollers in succession to observing position, together with means for indicating the chart roller at observing position and for locking the moving means with said rollers in observing position, and wherein an indicating roller is provided, having faces corresponding to the number of series of chart rollers, and bearing matter cooperating with the matter on the chart rollers, and controlled by the revolution of the chart rollers.

Figure 1:
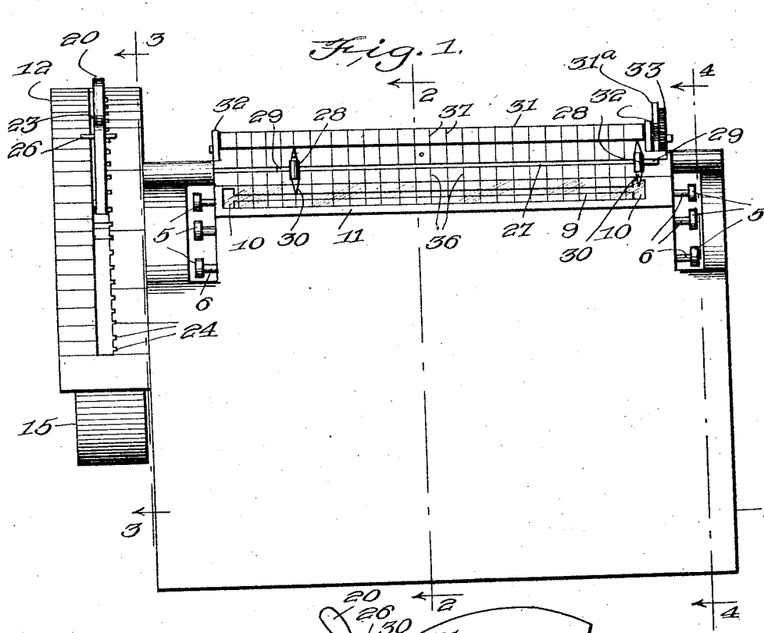
Figure 1 is a front view of the machine.
Figure 2:
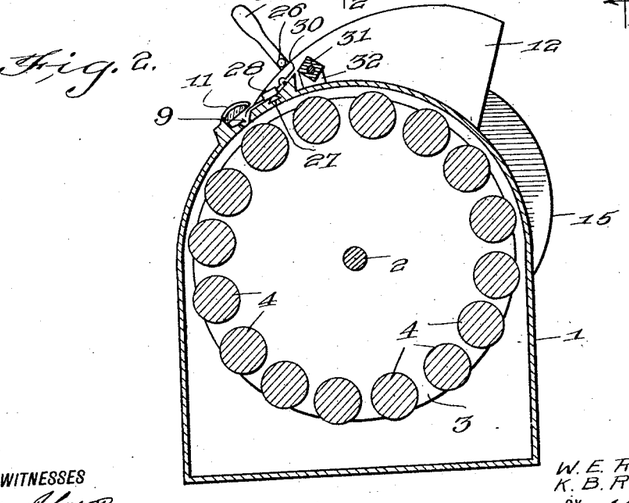
Figures 2, 3 and 4 are sections on the lines 2—2, 3—3, and 4—4 respectively of Figure 1.

In the embodiment of the invention shown in Figures 1 to 12, a casing 1 is provided, of suitable size and formation, the said casing having its top rounded, as shown in Figure 2, and within this casing there is mounted to rotate a drum composed of a shaft 2, and a pair of heads 3 secured to the shaft, the heads being near the ends of the casing.

A series of chart rollers 4 is mounted between the heads to move with the heads, and the rollers are journaled in the heads to move independently of the rotative movement of the drum. The rollers 4 are mounted at the peripheries of the head, their axes being in a cylinder whose axis is the shaft 2. Each of these chart rollers has at each end a head 5, the said heads being extended through the ends of the casing, and by means of the heads the cylinders may be rotated. Each cylinder bears upon its peripheral surface data to be described, and referring to Figure 1, it will be seen that the ends of the casing 1, near the top, are offset inwardly, so that while the heads 5 project beyond the said ends, they are within the planes of the ends of the casing.

Figure 9:
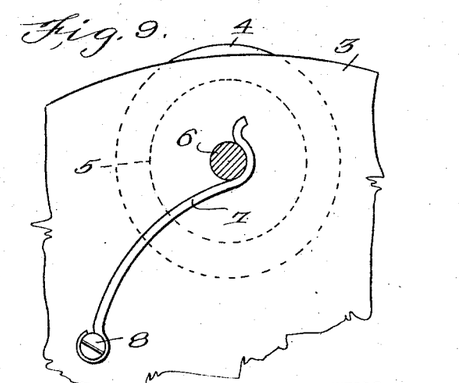
Figure 9 is a detail section showing the tensioning apparatus for the rollers.
Figure 10:
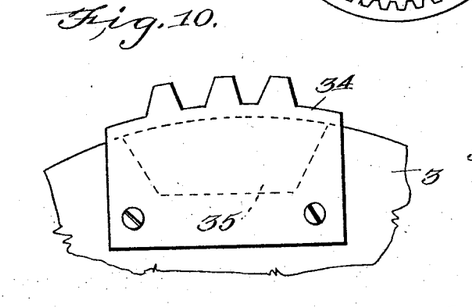
Figure 10 is a detail of one of the rack bars.
Figure 11:
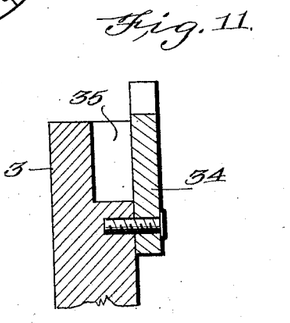
Figure 11 is a radial section.

Each head 5 of each chart roller is connected to the roller by a stem, or axial journal pin 6, and each of these pins 6 is engaged by tensioning mechanism shown in Figure 9. The said tensioning mechanism comprises a spring 7 of wire or the like, having one end secured to the end of the casing, as indicated at 8, and the other end is curved to engage about the stem or journal pin, as shown, to exert a tensioning or braking action on the movement of the chart roller.

These chart rollers are adapted to be brought in succession into observing position at a longitudinally extending slot or passage 9 in the front of the casing 1, the said slot or passage being enlarged laterally at its ends, as shown at 10 in Figure 1, and preferably an enlarging lens, indicated at 11, is supported over this slot or passage, the said lens being designed to magnify the data on the chart roller, so that it will be clearly visible through the slot or passage.

Figure 3:
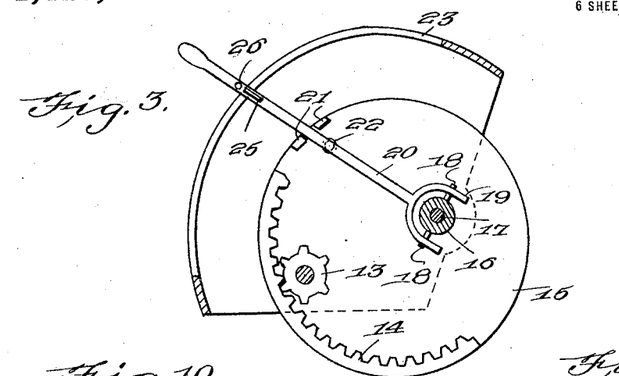

An auxiliary casing 12 is arranged at the left end of the casing 1, the shaft 2 extending into this auxiliary casing, and a pinion 13 is secured to the shaft within the auxiliary casing. The auxiliary casing has its front curved, as shown in Figure 3, and the teeth of the pinion 13 are engaged by the teeth of an arc-shaped rack bar 14, which is secured to one face of a disk 15, which has an eccentric hub 16 journaled on a pivot pin 17, which pivotally connects the disk to the auxiliary casing.

The hub 16 has oppositely extending pins 18, which are journaled in the arms of a fork 19 on one end of a lever 20, which extends between a pair of lugs 21 at the periphery of the disk, and at one end of the rack bar 14. This arrangement permits the lever to swing laterally longitudinal of the hub, while at the same time the disk may be rotated by swinging the lever circumferentially with respect to the hub.

A coil spring 22 is arranged between the lever and the disk, and this spring acts normally to press the lever away from the disk. The free end of the lever extends out through a slot 23 in the auxiliary casing 12, the said slot extending circumferentially of the hub 16, and one edge of the slot has notches 24 which are adapted to be engaged by a catch lug 25 on the lever, to hold the lever in adjusted position. The lug 25 may be easily released from the notches by swinging the lever toward the opposite side of the slot or passage.

An indicator 26 is arranged transversely of the lever, just outside the auxiliary casing, and the ends of the said indicator cooperate with scales arranged at opposite sides of the slot or passage 23, to be later described.

A rack bar 14 is coaxial with the shaft 17 and when the hub 16 and the disk 15 are rotated by the swinging of the lever, the pinion 13 will also be rotated through the engagement of the teeth of the rack bar 14 with those of the pinion 13, and the drum will be rotated. The notches 24 are so arranged with respect to the chart rollers, that when the catch lug 25 is in engagement with a notch, a chart roller will be in register with the slot or passage 9 of the casing. The movement of the lever one notch will move the drum a distance such that another chart roller will be brought into observing position beneath the opening 9.

Figure 12:
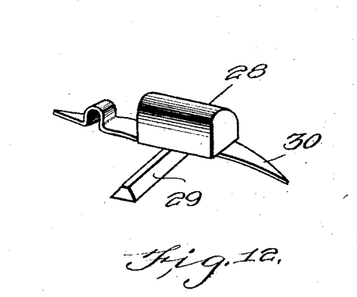
Figure 12 is a perspective view of one of the indicators.

Just above the opening 9, and extending parallel therewith, there is provided an undercut guideway 27, in which are movable indicators, one of which is shown in Figure 12. Each of these indicators consists of a block 28, which forms a finger piece for manipulating the indicator, and to each block there is secured a slide 29, fitting the guideway, and extending transversely of the block.

The indicator proper is a metallic strip 30, secured longitudinally of the block on the face adjacent to the slide, and extending beyond both ends of the block, and the ends of the strip are pointed as shown. One end of the strip 30 cooperates with the indications on the chart rollers, and the other end, which is bent at an angle to the body of the strip, as clearly shown in Figure 2, cooperates with an indicating roller 31, journaled above the guideway.

This roller 31, which is polygonal in cross section, has journal pins which are journaled in upwardly extending bracket lugs 32 from the top of the casing. At that end remote from the auxiliary casing 12, the roller 31 has a pinion or gear wheel 33, and this pinion is adapted to be engaged by rack bars 34 secured to that head 3 of the drum which is remote from the auxiliary casing 12.

These rack bars 34 are in the form of plates, which are secured over mortises or recesses 35, in the periphery of the head 3 and at the outer face thereof. The outer edge of each rack bar is formed on an arc whose center is the axis of the drum, and the rack bars are so arranged that they will engage the pinion 33 after a certain predetermined number of chart rollers have passed the roll 31. The arrangement is such that the roll 31 will be given a rotative movement through a predetermined arc at predetermined moments, and the chart rollers are so arranged with respect to the rack bars 34, and the rack bars and the roller 31 are so geared together, that the roll 31 will be turned a distance sufficient to bring another face into operative position, when a predetermined number of chart rollers have passed the opening 9 in the case 1.

Figure 4:
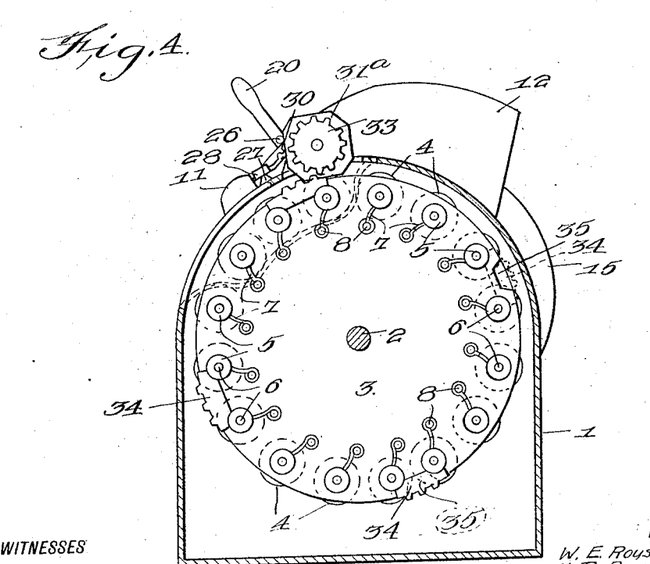
Figure 5:
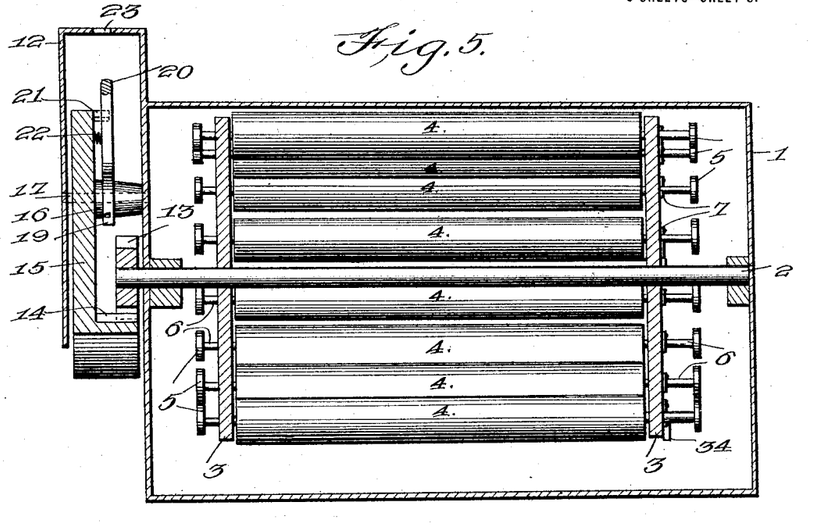
Figure 5 is a longitudinal section.

Referring to Figure 4, it will be seen that a head 31ª is secured to the shaft of the indicating roll 31, between the pinion 33 and the adjacent bearing. This head has four sides, the corners being rounded, and it is adapted to engage the disk 3 at that end, to lock the indicating roll against accidental turning. Thus when the drum is rotated to bring another series of rollers into observing position, the rounded corners of the head 31ª may turn by entering the mortise 35 adjacent to the rack plate 34, thus permitting the indicating roll to turn. As soon however as the corner of the head is out of the mortise, the indicating roll is locked, and cannot turn until another mortise 35 is brought to the head, that is until another rack bar engages the pinion 33. It will be understood that the shape of the head corresponds to the shape in cross section of the indicating roll. That is in a four sided roll, the head will be four sided.

In the present instance, the roll 31 is square in cross section, that is, it has four faces, the chart rollers are 16 in number, that is, there are 4 chart rollers for each face of the indicating roll 31. The rack bars 34 are so arranged that the indicating roll will be rotated a quarter turn four times during a complete rotation of the chart roller supporting drum. That is, every time a series of four chart rollers passes the opening 9, the indicating roller will be given a quarter turn.

Of the data which is upon the faces of the indicating roll and upon the chart rollers, that upon each series of four rollers is used in connection with one face of the indicating roll, in a manner to be presently described.

A series of guiding or indicating lines 36 is arranged transversely of the opening 9, the said lines being spaced at equal intervals, and extending above and below the opening 9, and above the guideway 27 in which the indicating slides move. The faces of the indicating roll 31 are provided with similar guiding lines 37, which register with the lines 36.

Figure 6:
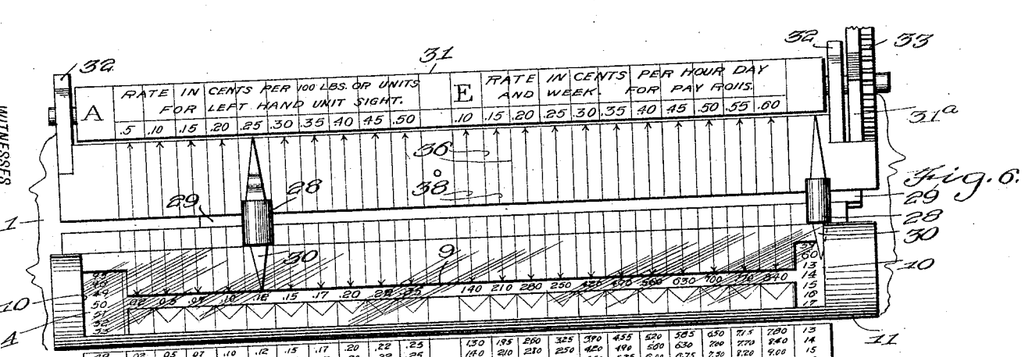
Figure 6 is a front view of the indicating mechanism.

Referring to Figure 6, it will be seen that between the lines 36 before mentioned, there is provided a series of other lines 38, alternating with the lines 36, and these lines 38 have at each end arrow heads, as shown.

Between the lines 36 and 37, there is provided on the faces of the roller 31, series of numerals, a series being arranged at each end of each face, one series being indicated at A and the other at E. In the present instance, the four faces of the roller 31 may be distinguished by the letters A, B, C, D at one end, and E, F, G, H, at the other end. The numerals on the face A—E are for the first series multiples of five, commencing with 5 and ending with 50. At the other end, there are also multiples of 5, commencing with 10 and ending with 60. Above the series A is arranged a legend reading "Rate in cents per 100 lbs, or units for left hand unit sights" (28). The legend at the right of the face reads "Rate in cents per hour, day and week. For pay rolls."

It will be understood that each face bears different numerals and different legends, and this matter may be whatever desired. As, for instance, on face B—F of the indicating roll might be carried "Rate in dollars per 100 lbs." and in this instance there would be but a single series of numerals, the numerals representing dollars. A scale of this character would be especially desirable for tobacco handlers.

Figure 7:
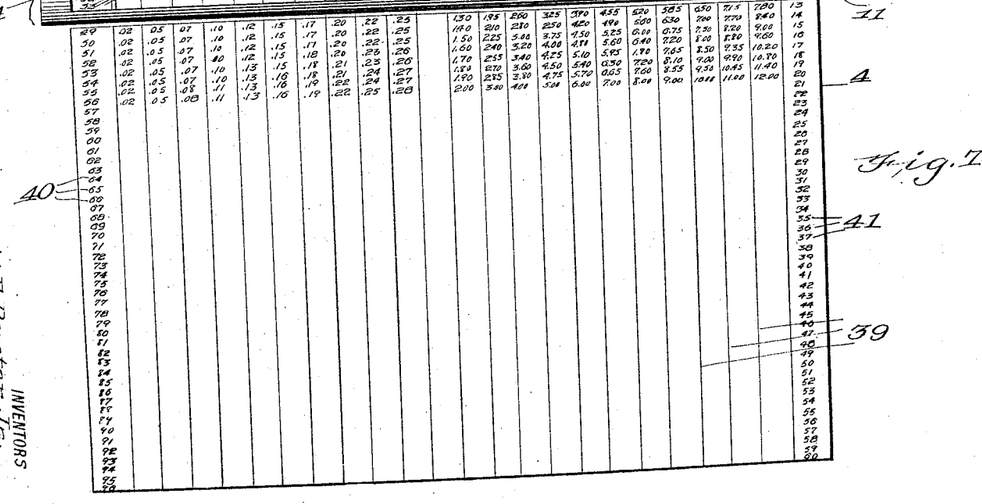
Figure 7 is a diagrammatic view of the face of one of the chart rollers.

In Figure 7 there is shown the face of one of the chart rollers 4. Each of these rollers on its peripheral surface is provided with circumferentially extending lines 39, dividing the said surface into a series of columns or zones. Within these zones there is arranged series of numerals 40. In the roller shown in Figure 7, at the left side edge, there is a series of numerals running consecutively from 49 to 96, and in the columns adjacent thereto there is arranged a series of numerals which bear certain relations to the series 40 and to the adjacent series on the face of the roll 31. That is, in that column above which is the numeral 5 on the roll 31, there is arranged adjacent to each member of the series 40 a series of numerals which is the product of the numeral 5 by the series of numerals in the series 40, which is immediately to the left. As, for instance, the series of numerals 49 has in line therewith, reading from left to right .02, which is the product of 49 by .5, omitting the decimals after the second place. In the third column from the left, in line with the series of numerals 49 there is arranged the amount .05, which is the product of 49 by .10, the tenth of cents being omitted. Beneath the numeral 50 on the roll 31 at the top of the last column, under series A, there is found the product .25, which is the product of 49 by .50. This computation is carried out for all of the amounts in the series 40.

On the four chart rollers, which correspond to the faces A—E of the roll 31, the numerals in series 40 run on the first roller from 1 to 48, on the second roller from 49 to 96, on the third roller from 97 to 144, on the fourth roller from 145 to 192. Those rollers which correspond to the face A—E of the roll 31 carry at the right a series 41 of numerals, and those series of numerals in the adjacent columns are products of these numerals in series 41 with those numerals at the head of the columns on the roll 31, at the right end of the said roll.

It will be obvious that any arrangement of numbers might be used in columns 40 and 41 and at the heads of the columns on the roll 31, and that the products might be either multiplications, divisions, subtractions or additions. The indicators 28 are designed to point out the products particularly at the passage 9. If, for instance, it is desired to obtain the product of 50 x .25, the indicator 28 is moved until the upper end thereof points to the numeral .25. The lower end will point at the numeral .12, which is the product of 50 x .25. That indicator 28 at the right of the passage 9 cooperates with the scale under E and with the series 41 of numerals at the right of the chart rollers. It will be understood that the chart rollers of each series are complementary, the matter upon each being supplementary to that upon the others.

Figures 8, 14, 15, 16:
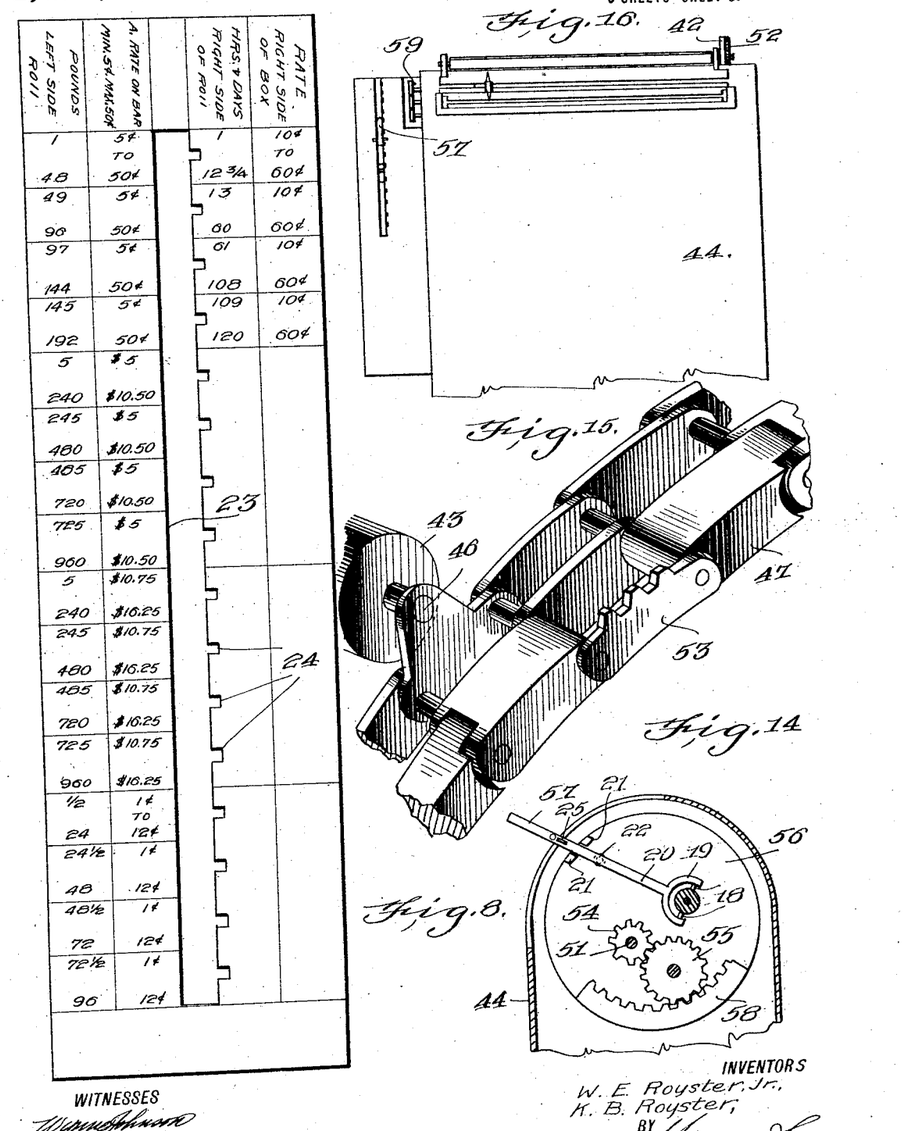
Figure 8 is a front view of the indicating plate cooperating with the controlling lever.
Figure 14 is a view similar to Figure 3 of the said embodiment.
Figure 15 is a perspective view of a portion of the chain.
Figure 16 is a front view of the indicating mechanism.

In Figure 8 there is shown the matter which is arranged adjacent to the slot or passage 23. There is arranged adjacent to this passage, and adjacent to the notches 24, indications permitting the desired chart roller to be properly arranged at the opening 9, by means of the lever 20. Referring to this figure it will be seen that the face of the auxiliary casing 12 at the slot is provided with vertical lines and with horizontal lines, forming spaces in which are arranged legends and pairs of numerals. At the heads of the vertical columns, there are arranged legends as follows:—From right to left, "Rate right side of box."
"Hours and days, right side of roll."
"A. right on bar, Min. 5¢, Max. 50¢"
"Lbs., left side of roll."

Within the squares beneath this legend there is arranged at the left, the numerals 1 to 48, 49 to 96, and the like. That is, matter indicating the rolls which will be at the opening 9, when the lug 25 of the lever 20 is in engagement with the adjacent notch.

In operation, when it is desired to find any product, as, for instance, the cost of 192 lbs. of some commodity at 50¢ per hundred lbs., the lever 20 is grasped and moved downwardly in the slot 23, until the indicator 26 of the said lever points at that space which bears the numerals 145–192. The fourth roll of the first series of chart rollers will now be at the opening 9, and the said chart roll carries at the left in series 40, the numerals 145 to 192. Now the operator grasps the indicator 28 and moves it until the upper end thereof registers with the numeral 50 in series A. Looking at the lower end of the indicator in passage 9 there will be found the numeral .96, this being the cost of 192 lbs. of the commodity at 50¢ per hundred lbs. It will be understood that a notch 24 is provided for each chart roller, and when the lug 25 of the lever 20 is in engagement with the said notch, the particular chart roller will be at the opening 9. It will be evident that any matter desired might be provided upon the chart rollers, the proper indications being arranged adjacent to the slot 23 and on the indicating roll. Every time the last of a series of rollers passes the opening 9, a bar 34 will engage the pinion 33, and the indicating roller will be given a quarter turn. It will be evident that any number of series of chart rollers might be used, as, for instance, in Figures 13, 14 and 15 there is shown a construction wherein the indicating roll 42 is pentagonal in cross section, having five faces instead of four. There are provided also 20 chart rollers, indicated at 43. the said rollers being arranged in series of four, and there being five series, one series of four for each face of the pentagonal roll.

The case 44 is similar to that shown in Figure 1, having the sight opening, the indicators 45 and the like. The rollers 43 are journaled at their ends in bearing lugs 46 on endless chains 47, which are supported by sprocket wheels 48 and 49, the chart rollers connecting the chains at each end of the case. These sprocket wheels 48 and 49 are secured on the shafts 50 and 51, which are journaled in the case, and the indicating roll 42 has a pinion 52 at one or both ends, which is adapted to be engaged by rack bars 53 secured to one or both of the chains. These rack bars are arranged between the series of four rollers in such manner that as the last roller of a series passes away from the opening 9, a rack bar will engage the pinion and will move the pentagonal roll a distance of 72°. That is, a distance sufficient to expose another face of the roll.

The shaft 51 carries at that end adjacent to the operating lever a pinion 54, and this pinion meshes with a larger pinion 55 journaled on the disk 56, which corresponds to the disk 15 of Figure 3. A controlling lever 57, corresponding in all respects to the lever 20 of Figure 3 and similarly mounted, is connected with the disk for operating same, and the disk carries an arc-shaped rack bar 58, which meshes with the pinion 55. When the lever 57 is moved, the pinion 54 will be rotated through the rack bar and pinion 55, and the wheels 49 will be moved a sufficient distance to advance another chart roller to the sight opening.

Each of these rollers 43 is provided at that end adjacent to the lever 57 with a head 59 for convenience in rotating the same. The construction is otherwise the same as that shown in Figure 1, and the matter on the rollers 43 and on the roll 42 and on the case is similar to that above described for the embodiment of the invention shown in Figures 1 to 12.

Figure 13:
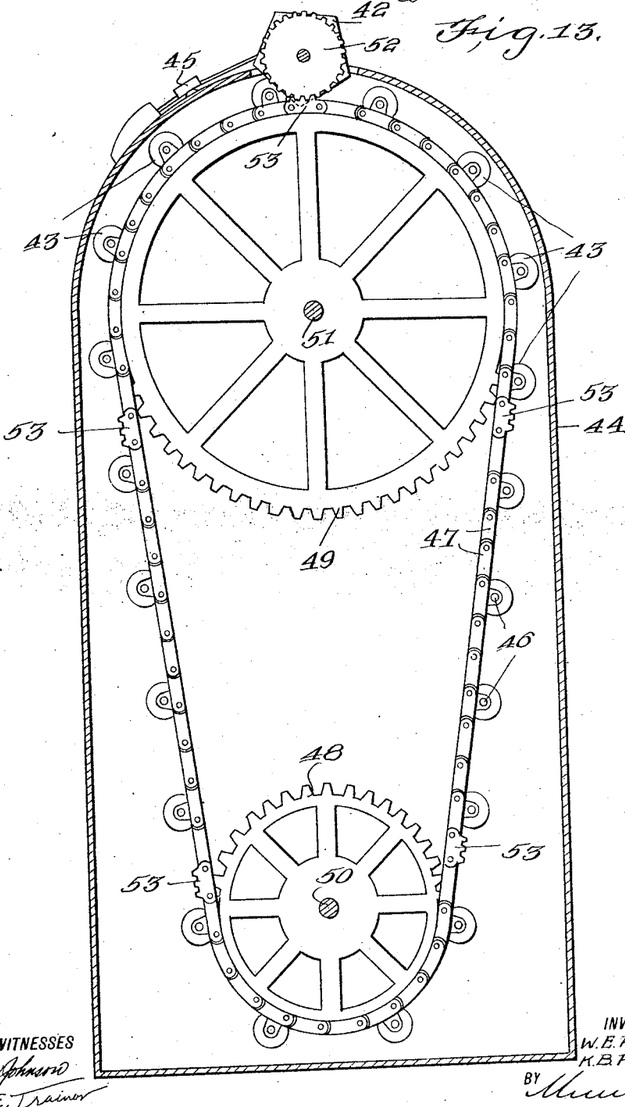
Figure 13 is a section similar to Figure 4 of another embodiment of the invention.

A locking device for the indicating roll similar to that shown in Figure 4 is provided for the construction just described. This mechanism comprises a head 42$^a$ which is secured to the shaft of the indicating roll 42 between the pinion 52 and the adjacent bearing, and since the indicating roll has five faces the head has five sides. The sides of this head 42$^a$ bear upon the adjacent endless chain 47, thus holding the indicating roll 42 in the proper position. When the roll 42 is turned to co-operate with a new set of chart rollers, the corner of the head 42$^a$ engages within a link of the chain and is turned. The rack bars 53 are so placed that the corners of the head will engage within the link during the turning. This locking device insures the proper placing of the indicating roll and the proper holding of the said roll while the series of charts pertaining to that face of the roll exposed is being used.

It will be evident from the description that each chart roller carries products which are arranged in rows extending longitudinally of the roller and extending circumferentially thereof, the products in each row having a common factor, the chart roller carrying the common factors of the longitudinally extending rows, while the common factors of the circumferentially extending rows are arranged on the roll.

By using two indicators or pointers 28 the indicating roll may be arranged as follows: At one end there may be provided month indications, from 1 to 12, and at the other end day indications from 1 to 29, and that face of the roll which carries these indications may be the 6% face. With the left hand indicator 30 pointing for instance to a given number of months, say 6, and the right hand indicator 30 pointing to a given number of days say 15, and to a given amount on the co-operating chart roller say $100.00, the lower left hand indicator will show the amount of interest on the $100.00 for six months, and the right hand indicator will show the amount of interest on $100.00 for 15 days.

It will be understood that a series of chart rollers may be constituted of any number that may be required to carry a series of charts, and the indicating roll 31 has a face to co-operate with each set of rollers. It is obvious also that when but a single series of chart rollers are used, but one face of the indicating roll is required to be used. The provision of the arrangement shown in Figure 13 permits a great number of chart rollers to be used without making the machine too bulky.

The several parts of this machine may be made of any suitable material and the relative size and proportion and the details of construction may be modified as may be found desirable, without departing from the spirit of the invention as set forth in the claims.

We claim:—

1. A computing machine comprising movable roller supporting members, a plurality of series of chart rollers carried thereby, a pinion connected to one of said roller supporting members, a disk having an arcuate rack operatively connected with said pinion whereby the movement of said disk operates said roller supporting members, and an operating lever for said disk.

2. A computing machine comprising movable roller supporting members, a plurality of series of chart rollers carried thereby, a pinion connected to one of said roller supporting members, and a disk having an arcuate rack operatively connected with said pinion whereby the movement of said disk operates said roller supporting members.

3. A computing machine comprising movable roller supporting members, a plurality of series of chart rollers carried thereby, a pinion connected to one of said roller supporting members, a disk having an arcuate rack operatively connected with said pinion whereby the movement of said disk operates said roller supporting members, an operating lever for said disk, and a dial cooperating with said lever.

4. A computing machine comprising movable roller supporting members, a plurality of series of chart rollers carried thereby, a pinion connected to one of said roller supporting members, a disk having an arcuate rack operatively connected with said pinion whereby the movement of said disk operates said roller supporting members, an operating lever for said disk, a dial cooperating with said lever, and an indicator carried by said lever and movable over said dial.

5. A computing machine comprising movable roller supporting members, a plurality of series of chart rollers carried thereby, a pinion connected to one of said roller supporting members, a disk having an arcuate rack operatively connected with said pinion whereby the movement of said disk operates said roller supporting members, an operating lever for said disk, a dial cooperating with said lever, and an indicating roller associated with said series of chart rollers.

6. A computing machine comprising movable roller supporting members, a plurality of series of chart rollers carried thereby, a pinion connected to one of said roller supporting members, an arcuate rack operatively connected with said pinion, an operating lever for said rack, a dial cooperating with said lever, and an indicating roller associated with said series of chart rollers, and having flat faces corresponding in number to the number of series of rollers.

7. A computing machine comprising movable roller supporting members, a plurality of series of chart rollers carried thereby, a pinion connected to one of said roller supporting members, an arcuate rack operatively connected with said pinion, an indicator roller associated with said series of rollers and having flat faces corresponding in number to the number of series of rollers, and means carried by said roller supporting members for periodically turning said indicator roller.

8. A computing machine comprising a chart roller supporting member having spaced recesses, series of chart rollers carried by said supporting member, an indicating roller having spaces corresponding in number to the series of rollers, a polygonal sided head connected to said indicating roller and having flat sides adapted to engage the roller supporting member whereby to hold the indicating roller against accidental rotation, the corners of said head being adapted to be received within said recesses.

9. A computing machine comprising a chart roller supporting member having spaced recesses, series of chart rollers carried by said supporting member, an indicating roller having spaces corresponding in number to the series of rollers, a polygonal sided head connected to said indicating roller and having flat sides adapted to engage the roller supporting member whereby to hold the indicating roller against accidental rotation, the corners of said head being adapted to be received within said recesses, spaced racks carried by said supporting member, and a pinion connected to said indicating roller and periodically engaged by said arcuate racks.

10. A computing machine comprising a chart roller supporting member having spaced recesses, series of chart rollers carried by said supporting member, an indicating roller having spaces corresponding in number to the series of rollers, a polygonal sided head connected to said indicating roller and having flat sides adapted to engage the roller supporting member whereby to hold the indicating roller against accidental rotation, the corners of said head being adapted to be received within said recesses, spaced racks carried by said supporting member, and a pinion connected to said indicating roller and periodically engaged by said arcuate racks, and means to rotate said chart roller supporting member.

11. A computing machine comprising a chart roller supporting member having spaced recesses, series of chart rollers carried by said supporting member, an indicating roller having spaces corresponding in number to the series of rollers, a polygonal sided head connected to said indicating roller and having flat sides adapted to engage the roller supporting member whereby to hold the indicating roller against accidental rotation, the corners of said head being adapted to be received within said recesses, cooperating means carried by said supporting member and said indicating roller for periodically rotating said indicating roller, means to rotate said chart roller supporting member, and a casing receiving said chart roller supporting member and said chart roller.

WILLIAM EDWIN ROYSTER, Jr.
KENNETH BETHEL ROYSTER.